(12) United States Patent
Tsai (10) Patent No.: US 10,555,338 B2
(45) Date of Patent: Feb. 4, 2020

(54) NR-PRACH MULTIPLE MSG1 TRANSMISSION

(71) Applicant: MediaTek Inc., Hsin-Chu (TW)

(72) Inventor: Chiou-Wei Tsai, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 16/056,296

(22) Filed: Aug. 6, 2018

(65) Prior Publication Data

US 2019/0053272 A1 Feb. 14, 2019

Related U.S. Application Data

(60) Provisional application No. 62/544,147, filed on Aug. 11, 2017.

(51) Int. Cl.
| | |
|---|---|
| *H04L 12/50* | (2006.01) |
| *H04W 74/04* | (2009.01) |
| *H04W 76/27* | (2018.01) |
| *H04W 72/04* | (2009.01) |
| *H04W 72/14* | (2009.01) |
| *H04W 74/08* | (2009.01) |

(52) U.S. Cl.
CPC ......... *H04W 74/04* (2013.01); *H04W 72/042* (2013.01); *H04W 72/14* (2013.01); *H04W 74/08* (2013.01); *H04W 76/27* (2018.02)

(58) Field of Classification Search
CPC .................................................. H04L 12/50
USPC .......................................................... 370/329
See application file for complete search history.

(56) References Cited

U.S. PATENT DOCUMENTS

| | | |
|---|---|---|
| 9,414,298 B1 | 8/2016 | Pasupuleti et al. |
| 2019/0150190 A1* | 5/2019 | Kim ....................... H04W 56/00 |

FOREIGN PATENT DOCUMENTS

| | | |
|---|---|---|
| WO | WO 2012/041204 A2 | 4/2012 |
| WO | WO 2016/123429 A1 | 8/2016 |

OTHER PUBLICATIONS

International Search Report and Written Opinion dated Oct. 25, 2018 in connection with International Application No. PCT/CN2018/099883.

(Continued)

*Primary Examiner* — Dang T Ton
(74) *Attorney, Agent, or Firm* — Wolf, Greenfield & Sacks, P.C.

(57) ABSTRACT

Methods and apparatus are provided to reduce access latency in a random-access channel (RACH) procedure. A user equipment (UE) can transmit multiple Msg1 on multiple RACH transmission occasions before the end of a random-access response (RAR) window. The UE receives one or more RARs in response to the multiple transmitted Msg1. The one or more RARs can be carried in a single RAR window or multiple RAR windows. The UE determines the detected Msg1 based on explicit signals, implicit indications, or both. The explicit signals can be carried in the one or more RARs received by the UE. The implicit indications can be one or more signatures being associated with the multiple RACH transmission occasions. The one or more signatures comprise at least one of physical random-access channel (PRACH) preambles or preamble indices, random-access radio-network temporary identifier (RA-RNTI) values, RAR windows, and control regions for physical downlink control channel (PDCCH).

20 Claims, 6 Drawing Sheets

(56) References Cited

OTHER PUBLICATIONS

Huawei et al., Impact of Multi-beam operations to Power Ramping for RACH 3GPP TSG-RAN WG2 NR Ad Hoc. R2-1706462 Jun. 29, 2017 (Jun. 29, 2017).

* cited by examiner

NR-PRACH MULTIPLE MSG1 TRANSMISSION

RELATED APPLICATIONS

This Application claims priority to and the benefit of U.S. Provisional Patent Application Ser. No. 62/544,147, filed on Aug. 11, 2017 and entitled "NR-PRACH Multiple Msg1 Transmission," which is hereby incorporated herein by reference in its entirety.

TECHNICAL FIELD

The present application relates generally to wireless network communication, and in particular to reduce access latency in a random-access channel (RACH) procedure.

BACKGROUND OF INVENTION

Wireless communication systems are widely deployed to provide various types of communication; for instance, voice and/or data can be provided via such wireless communication systems. 5th-Generation wireless systems (5G) aim to provide user experience matching fixed networks via increased data rates, improved spectrum efficiency, reduced latency, and better mobility support. 5G will enable not only enhanced mobile broadband but also wireless connectivity for any kind of device or any kind of application that may benefit from being connected.

SUMMARY OF INVENTION

Some embodiments relate to a method for performing a random-access channel (RACH) procedure. The method includes transmitting a plurality of physical random-access channel (PRACH) preambles (or referred to as "Msg1") by a user equipment (UE) on a plurality of RACH transmission occasions before an end of a first random-access response (RAR) window, and determining which one or ones of the plurality of Msg1 are detected based on explicit signals carried in one or more RARs received by the UE, and/or based on one or more signatures that are associated with the plurality of RACH transmission occasions.

In some embodiments, the one or more signatures comprise random-access radio-network temporary identifier (RA-RNTI) values, which are associated with the plurality of RACH transmission occasions, on which the multiple Msg1 transmissions have been transmitted.

In some embodiments, the one or more signatures comprise one or more RAR windows, during which the one or more RARs are sent.

In some embodiments, the one or more signatures comprise control regions for physical downlink control channel (PDCCH) configured to schedule RARs. The control regions comprise control resource sets (CORESETs) and search spaces. The CORESETs and/or search spaces are associated with the plurality of RACH transmission occasions.

In some embodiments, the one or more signatures comprise physical random-access channel (PRACH) preambles or preamble indices. The preamble indices are associated with the plurality of RACH transmission occasions completely or partially by higher layer signaling.

Some embodiments relate to a user equipment (UE). The UE includes a plurality of antennas and a processor in communication with memory. The processor is configured to execute instructions stored in the memory that cause the processor to: transmit a plurality of Msg1 over one or more of the plurality of antennas on a plurality of RACH transmission occasions before an end of a first random-access response (RAR) window, and determine which one or ones of the plurality of Msg1 are detected based on explicit signals carried in one or more RARs received by the UE, and/or based on one or more signatures that are associated with the plurality of RACH transmission occasions.

In some embodiments, the one or more signatures comprise at least one of physical random-access channel (PRACH) preambles or preamble indices, random-access radio-network temporary identifier (RA-RNTI) values, RAR windows, and control regions for physical downlink control channel (PDCCH) configured to schedule RARs.

In some embodiments, the one or more signatures comprise random-access radio-network temporary identifier (RA-RNTI) values, which are associated with the plurality of RACH transmission occasions, on which the multiple Msg1 transmissions have been transmitted.

In some embodiments, the one or more signatures comprise RAR windows, during which the one or more RARs are sent.

In some embodiments, the one or more signatures comprise control regions for physical downlink control channel (PDCCH) configured to schedule RARs. The control regions comprise control resource sets (CORESETs) and search spaces. The CORESETs and/or search spaces are associated with the plurality of RACH transmission occasions.

In some embodiments, the one or more signatures comprise physical random-access channel (PRACH) preambles or preamble indices. The PRACH preambles or preamble indices are associated with the plurality of PRACH transmission occasions completely or partially by higher layer signaling.

In some embodiments, if the one or more RARs is a single RAR or correspond to a single Msg1 of the plurality of Msg1, the processor being further configured to execute instructions stored in the memory that cause the processor to determine which one of the plurality of antennas should be used for following uplink transmissions based on antenna index explicitly carried in the one or more RARs, or based on the detected Msg1 indicated by the one or more RARs.

In some embodiments, if the one or more RARs are more than one RARs or correspond to more than one of the plurality of Msg1, the processor being further configured to execute instructions stored in the memory that cause the processor to: determine which one of the plurality of antennas should be used for following uplink transmissions based on performance indicators carried in the received RARs.

In some embodiments, if the one or more RARs are more than one RARs or correspond to more than one of the plurality of Msg1, the processor being further configured to execute instructions stored in the memory that cause the processor to use one or more uplink grants scheduled in the one or more RARs with the UE's corresponding antennas for following uplink transmissions if it is allowed by a network specification and configured by a base station that sends the one or more RARs.

Some embodiments relate to a user equipment (UE). The UE includes a plurality of antennas and a processor in communication with memory. The processor is configured to execute instructions stored in the memory that cause the processor to: transmit a plurality of Msg1 over one or more of the plurality of antennas on a plurality of RACH transmission occasions before an end of a first random-access response (RAR) window, and determine which one or ones of the plurality of Msg1 are detected based on one or more RARs received by the UE during one or more RAR windows configured by a network.

In some embodiments, the one or more RAR windows is the first RAR window. The first RAR window starts after a predetermined duration after one of the plurality of Msg1 is transmitted.

In some embodiments, the size of the first RAR window is configured by the network via higher layer signaling or is configured to be the same as the size of an RAR window for single Msg1 transmission.

In some embodiments, the first RAR window starts after the predetermined duration after the first Msg1 of the plurality of Msg1 is transmitted or the last Msg1 of the plurality of Msg1 is transmitted.

In some embodiments, the one or more RAR windows are a plurality of RAR windows. Each of the plurality of RAR windows starts after a predetermined duration after one of the plurality of Msg1 is transmitted and having the same time duration.

In some embodiments, determining which one or ones of the plurality of Msg1 are detected comprises reading explicit signals carried in the one or more RARs or deriving from one or more signatures carried in the one or more RARs.

The foregoing summary is provided by way of illustration and is not intended to be limiting.

BRIEF DESCRIPTION OF DRAWINGS

In the drawings, each identical or nearly identical component that is illustrated in various figures is represented by a like numeral. For purposes of clarity, not every component may be labeled in every drawing. The accompanying drawings are not necessarily drawn to scale, with emphasis instead being placed on illustrating various aspects of the techniques and devices described herein.

DETAILED DESCRIPTION OF INVENTION

The inventors have realized and appreciated that transmitting multiple physical random-access channel (PRACH) preambles (or referred to as "Msg1") can reduce access latency in a random-access channel (RACH) procedure. For example, if a user equipment (UE) has multiple antennas capable of functioning as transmitter (TX) beams, the UE can transmit multiple Msg1 using one or more of the TX beams, which allows the UE to test multiple TX beams in a RACH procedure and thus accelerate the process of matching beams and scheduling communication between the UE and a base station.

The inventors have realized and appreciated that the detected Msg1 can be explicitly signaled in a random-access response (RAR), or implicitly signaled by associating RACH transmission occasions with one or more signatures including, for example, random-access radio-network temporary identifier (RA-RNTI) values, physical random-access channel (PRACH) preambles or preamble indices, random-access response (RAR) windows, and control regions for physical downlink control channel (PDCCH) to schedule RARs. A UE may determine its TX beams used in the following uplink transmissions based on the indication of the detected Msg1.

The inventors have also realized and appreciated that a UE may monitor a single RAR window that starts at a fixed duration after one of the multiple Msg1 has been transmitted. Alternatively, a UE may monitor multiple RAR windows, each of which starts at a fixed duration after one of the multiple Msg1 has been transmitted.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
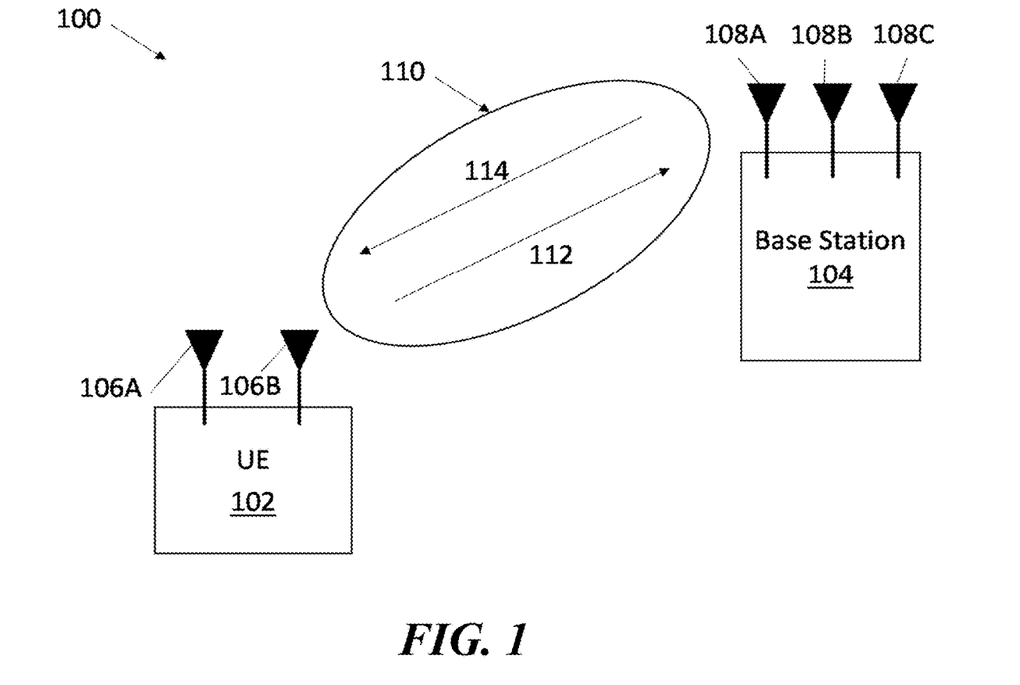
FIG. 1 shows an exemplary wireless communication system, according to some embodiments.

FIG. 1 shows an exemplary wireless communication system 100 (e.g., a 3G, 4G, and/or a 5G New Radio (NR) system), according to some embodiments. The wireless communication system 100 may include a user equipment (UE) 102 and a base station (BS) 104. A UE 102 can be, for example, a cell phone, a smart phone, a laptop, and/or any other device configured to wirelessly communicate with the BS 104. The BS 104 can be, for example, a base station (e.g., a cellular base station), such as an evolved Node B (eNB), a next Generation Node B (gNB), and/or the like. As shown in the example of FIG. 1, the UE 102 has two antennas, antennas 106A and 106B, collectively referred to herein as antennas 106. The BS 104 has three antennas, antennas 108A, 108B and 108C, collectively referred to herein as antennas 108. The UE 102 and BS 104 communicate over a wireless communications channel 110. Transmissions from the UE 102 to the BS 104 are often referred to as uplink (UL) communications, shown as 112. Any one of the antennas 106 and 108 may be dedicated as a transmitter beam or a receiver beam, alternatively, as a transceiver beam. Transmissions from the BS 104 to the UE 102 are often referred to as downlink (DL) communications, shown as 114. The configuration shown in FIG. 1 is a simplified example that is not intended to be limiting. For example, the UE 102 and/or BS 104 may have different numbers of antennas. As another example, the UE 102 and the BS 104 may communicate over a number of different frequencies and/or channels, which is not shown in FIG. 1. Additionally, the BS 104 is typically in communication with a plurality of UEs, although this is not shown in FIG. 1 for simplicity.

Figure 2:
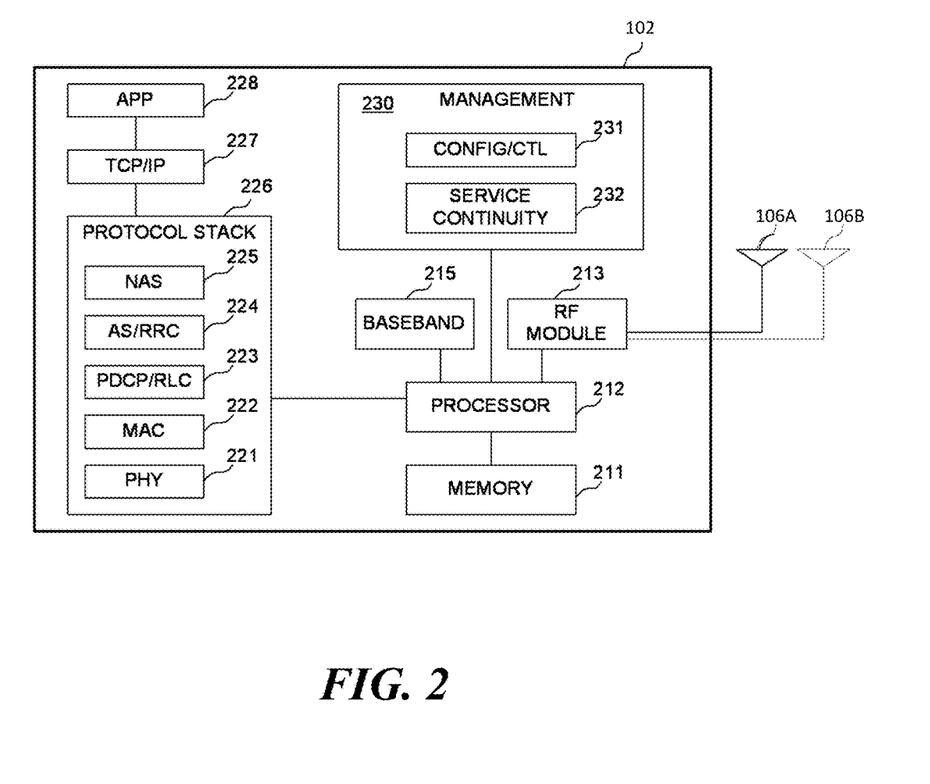
FIG. 2 shows an exemplary user equipment (UE), according to some embodiments.

FIG. 2 is a simplified block diagram of a user equipment (UE) 102, according to some embodiments. UE 102 may include a memory 211, a processor 212, a radio frequency (RF) module 213 coupled to antennas 106A and 106B, a baseband module 215, a communication protocol stack module 226 supporting various protocol layers including non-access stratum (NAS) 225, access stratum (AS)/radio-resource control (RRC) 224, packet data convergence protocol (PDCP)/radio link control (RLC) 223, medium access control (MAC) 222 and physical layer (PHY) 221, a transmission control protocol (TCP)/internet protocol (IP) protocol stack module 227, an application module (APP) 228, and a management module 230 including a configuration/control module 231, and a service continuity module 232. The PHY may further include three levels (not shown): transport channel processor, physical channel processor, and analogue processor.

The function modules and circuits, when executed by the processor 212 via program instructions contained in the memory 211, may interwork with each other. For example, an application may create data packets that are processed by protocols such as TCP and IP. The RRC protocol may write the signaling messages that are exchanged between the base station and the UE. In both scenarios, the information may be processed by the PDCP, the RLC protocol and the MAC protocol, before being passed to the physical layer for transmission. In some embodiments, each functional module or circuit may comprise a processor together with corresponding program codes.

The information flowing between the different protocols may be referred to as channels and signals. There may be physical data channels between the different levels of the PHY, for example, physical random-access channel (PRACH), physical uplink shared channel (PUSCH), and physical downlink shared channel (PDSCH). A PRACH may carry random-access transmissions from the random-access channel. A PUSCH may carry data and signaling messages from the uplink shared channel and can sometimes carry the uplink control information (UCI). A PDSCH may carry data and signaling messages from the downlink shared channel, as well as paging messages from the paging channel. There may also be physical control channels in the PHY, for example, physical downlink control channel (PDCCH) and physical uplink control channel (PUCCH). A PDCCH may carry downlink control information. A PUCCH may carry uplink control information.

There may also be transport channels between the MAC and PHY, for example, the random-access channel (RACH), through which the UE can contact the base station without any prior scheduling. For example, if a UE wishes to transmit on the PUSCH but does not have the resources to do so, the UE may send a scheduling request on the PUCCH. If the UE does not have the resources to send the scheduling request, the UE may initiate a RACH procedure. This may happen in a few different situations, for example, during the establishment of an RRC connection, during a handover or if the UE has lost timing synchronization with the base station.

Configuration and control module 231 may configure handover service interruption reduction features for the UE, monitor a radio resource status, and thereby determine whether a radio bearer has been established for an RRC connection for data transmission. A handover procedure can be between base stations of the same Radio Access Technologies (RAT) or between different RATs (inter-RAT). When a handover event occurs, the radio resource is at first released in the serving radio network and then established in the target radio network. Service continuity module 232 may determine whether to release the NAS signaling connection after completing the NAS signaling procedure based on whether the radio bearer has been established or is being established.

Figure 3:
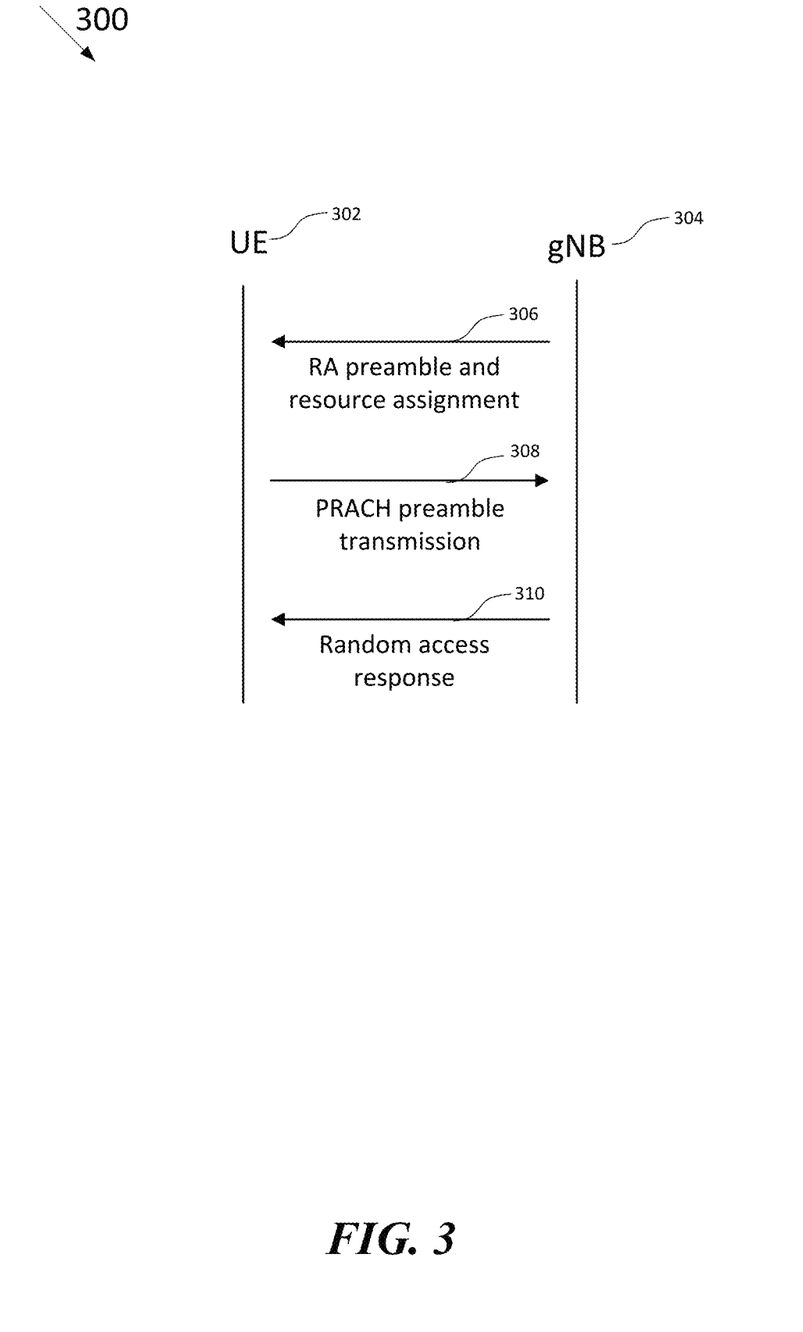
FIG. 3 shows an exemplary diagram of a contention-free random-access channel (RACH) procedure, according to some embodiments.

FIG. 3 shows an exemplary diagram of a contention-free RACH procedure 300, according to some embodiments. If a base station can reserve a preamble sequence for a UE, then it can guarantee that no other UE will be using that sequence in the same set of resource blocks, which is the basis of a contention-free random-access procedure. A contention-free RACH procedure may be used as part of a handover.

The contention-free RACH procedure 300 starts from act 306 when a base station 304 sends to a UE 302 a random-access (RA) preamble assignment, which may include a preamble index. The UE 302 reads the RA preamble assignment and reconfigures itself as instructed. However, the UE 302 does not yet have timing synchronization. At act 308, the UE 302 sends multiple PRACH preambles (or Msg1) over one or more antennas of the UE 302 on multiple RACH transmission occasions before the end of a random-access response (RAR) window, which may be configured by a network. A RACH transmission occasion may be defined as the time-frequency resource on which a PRACH Msg1 is transmitted using the configured PRACH preamble format with a single particular TX beam. In NR, there may be one or more RACH transmission occasions that are frequency division multiplexed (FDM'ed) at the same time instance in both frequency-division duplex (FDD) mode and time-division duplex (TDD) mode. The transmission time and frequency together may determine a mobile identity known as RA radio-network temporary identifier (RA-RNTI).

At act 310, if the base station 304 detects at least one of the multiple Msg1, the base station 304 replies with a PDCCH scheduling command, which addresses to the detected Msg1' RA-RNTI. The base stations 304 also sends one or more RARs, which may identify the preamble sequences that the UE 302 used and give the UE 302 one or more uplink scheduling grants and initial values for the uplink timing advances.

Figure 5A:
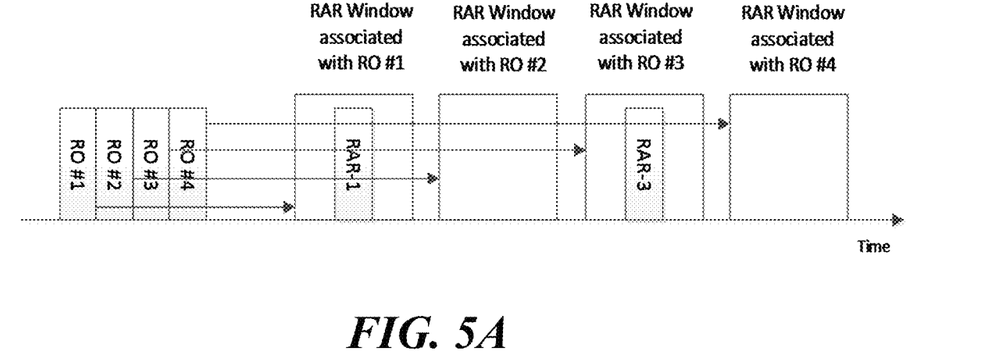
FIGS. 5A-5C are timing diagrams, illustrating alternative configurations of RAR windows for multiple physical random-access channel (PRACH) preambles (or referred to as "Msg1") transmissions, according to some embodiments.
Figure 5B:
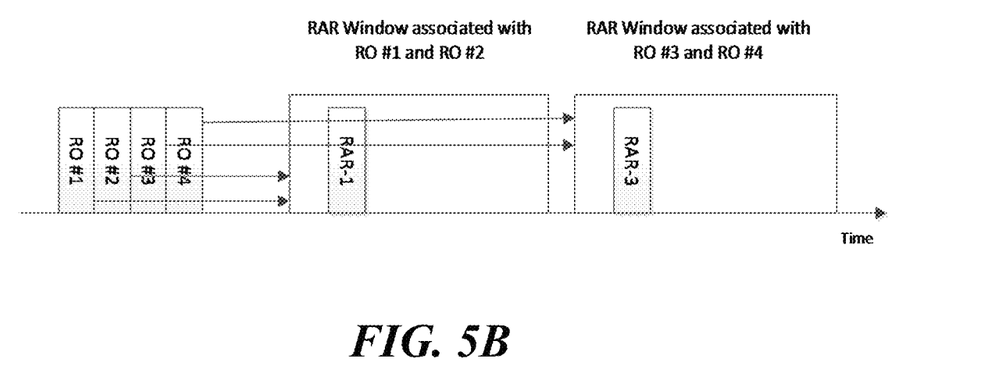
Figure 5C:
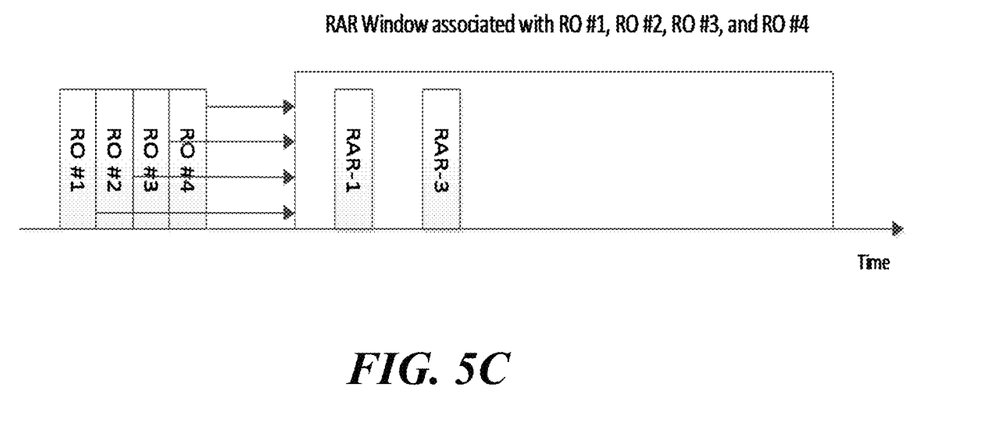

In some embodiments, the UE 302 may monitor a single RAR window that starts at a fixed duration after one of the multiple Msg1 has been transmitted. The fixed duration may be zero time or several symbols in FDD and TDD, respectively. The fixed duration may be counted from the last symbol that the transmitted preamble ends. The size of the RAR window may be in the unit of symbols. The size of the RAR window may be configured by the network via higher layer signaling (e.g., layers above PHY in the protocol stack 226 of FIG. 2) or can be the same as the size of an RAR window for single Msg1 transmission without additional signaling. For example, the RAR window may start at a fixed duration of X symbols after a preamble is transmitted. The fixed duration of X symbols may be the same for all DL synchronization signal (SS) blocks if multi-beam operations are considered. FIG. 5C illustrates an exemplary configuration of a single RAR window for multiple Msg1 transmissions.

In some embodiments, the UE 302 may monitor multiple RAR windows. Each RAR window may start at a fixed duration after one of the multiple Msg1 has been transmitted. Each RAR window may have the same size (e.g., time duration). It should be appreciated that the present application is not limited to multiple RAR windows starting at the same time and/or having the same size. A UE may monitor any RAR windows configured by a network. FIGS. 5A-5B illustrate exemplary configurations of multiple RAR windows for multiple Msg1 transmissions.

In some embodiments, the indication of which one or ones of the multiple transmitted Msg1 are detected by the base station 304 can be explicitly carried in an RAR. For example, the configuration of the RACH transmission occasion of the detected Msg1 can be explicitly signaled in an RAR. However, explicit signaling may require additional fields in the RAR content for contention-free RACH.

Alternatively or additionally, the indication of which one or ones of the multiple transmitted Msg1 are detected by the base station 304 can also be implied by one or more signatures that are associated with the multiple RACH transmission occasions. The one or more signatures may include at least one of RA-RNTI values, RAR windows, and control regions for PDCCH to schedule RARs.

In some embodiments, the UE 302 may derive which Msg1 is detected by the RA-RNTI values that it has used to detect RAR if these multiple Msg1 transmissions are transmitted on different RACH occasions, which are time-frequency resources and are associated with different RA-RNTI values. For example, if a RA-RNTI value is determined by the unit of symbol, a UE can determine which Msg1 has been detected by a base station based on the RA-RNTI value associated with a received RAR as long as the multiple RACH transmission occasions are located in different symbols.

In some embodiments, the UE 302 may derive which Msg1 is detected by monitoring different RAR windows for responses to Msg1 that it has transmitted on different RACH transmission occasions. For example, as illustrated in FIG. 5A, UE-1 has two beams (i.e. Beam1 and Beam2), each of which sends a Msg1 during two different RACH transmission occasions. Each of the two beams is associated with a corresponding RAR window. Therefore, UE-1 can derive which Msg1 is detected by monitoring the RAR windows associated with the two beams.

Figure 7A:
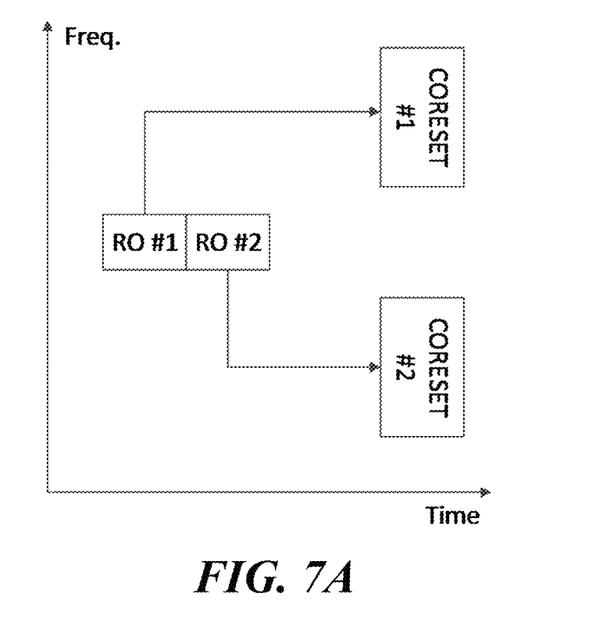
FIG. 7A shows an exemplary diagram, illustrating control resource sets (CORESETs) of physical downlink control channel (PDCCH) associated with different RACH transmission occasions, according to some embodiments.
Figure 7B:
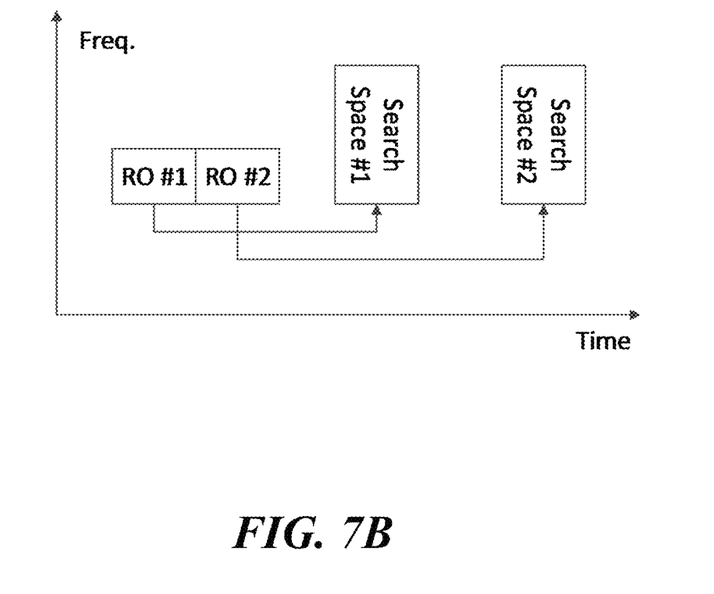
FIG. 7B shows an exemplary diagram, illustrating search spaces of PDCCH associated with different RACH transmission occasions, according to some embodiments.

In some embodiments, control regions for PDCCH may include control resource sets (CORESETs) and search spaces. A CORESET may specify the frequency location and symbol duration of a control region. A search space may specify the timing and periodicity of a control region. In some embodiments, the CORESETs may be associated with the RACH transmission occasions. For example, as illustrated in FIG. 7A, if a UE has chosen RACH transmission occasion #1 (RO #1) for Msg.1 transmission, then it would monitor PDCCHs that schedule the corresponding RAR on the control resource set #1 (CORESET #1) as configured by the network. If it has chosen RO#2 for Msg.1 transmission, then it would employ CORESET#2 for monitoring the corresponding RAR. In this way, UE can determine which preamble on which RACH transmission occasion has been detected. Alternatively or additionally, the search spaces may be associated with the RACH transmission occasions. For example, as illustrated in FIG. 7B, the timing of the search spaces associated with these two ROs does not overlap. Hence, the UE can determine which preamble on which RACH transmission occasion has been detected by the network if the UE has detected a PDDCH that schedules an RAR.

Figure 4:
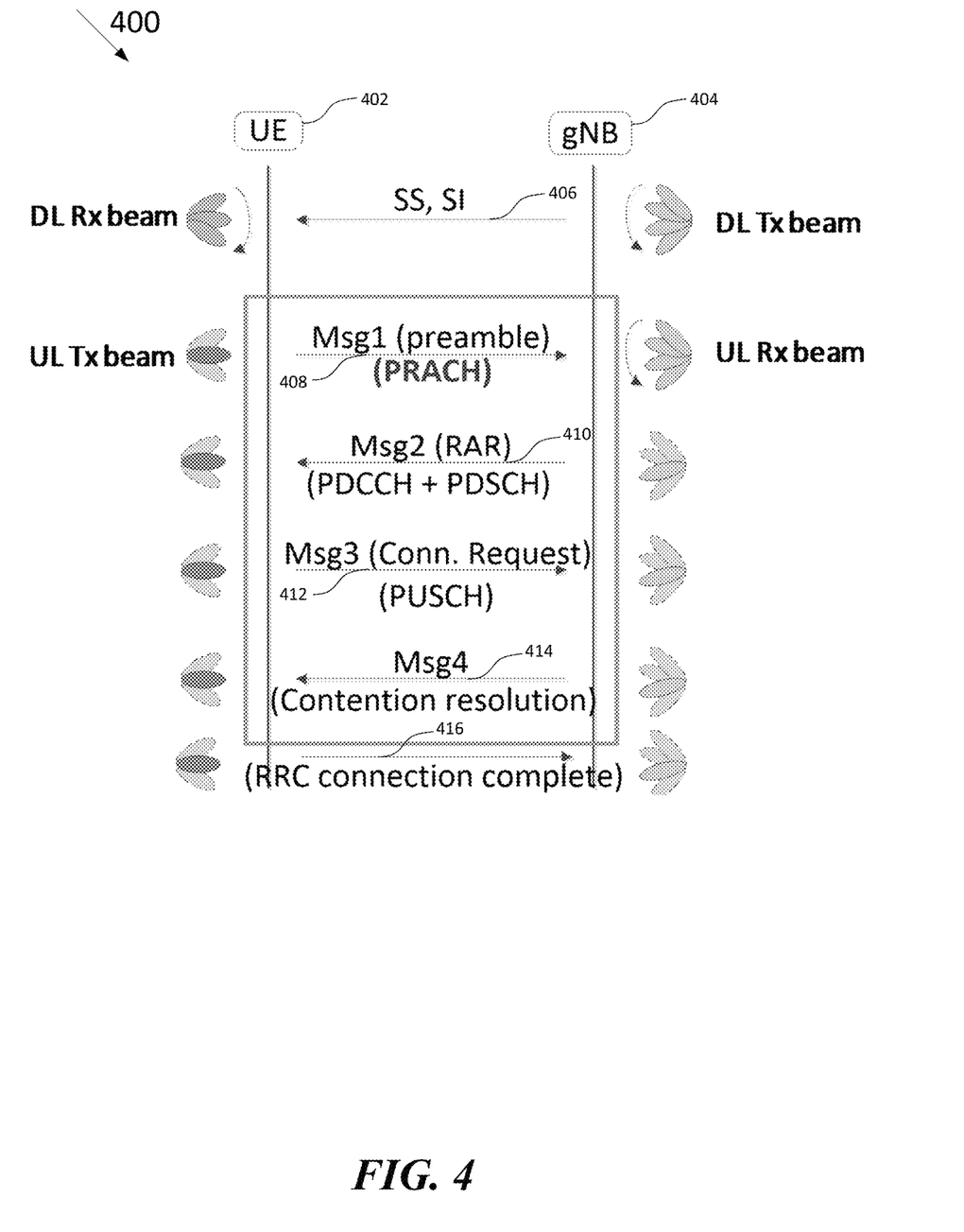
FIG. 4 shows an exemplary diagram of a contention-based RACH procedure, according to some embodiments.

FIG. 4 shows an exemplary diagram of a contention-based RACH procedure 400, according to some embodiments. A UE uses the contention-based random-access procedure if it has not been allocated a preamble index. This typically happens as part of a procedure known as RRC connection establishment.

For example, a UE 402 wishes to send a base station 404 an RRC message known as an RRC Connection Request, in which it asks to move from RRC_IDLE to RRC_CONNECTED. The UE 402 has no PUSCH resources on which to send the message and no PUCCH resources on which to send a scheduling request, so it triggers the RACH procedure 400.

At act 406, the base station 404 sends to the UE 402 DL synchronization signal (SS), which may include cell search and DL beam pair identification, and system information (SI), which may include master information block (MIB) and remaining minimum system information (RMSI) reading and RACH configuration carried in the RMSI.

At act 408, the UE 402 chooses one or more preamble sequences at random from the ones available for the contention-based procedure, and then sends multiple PRACH preambles (or Msg1), over one or more antennas of the UE 402 on multiple RACH transmission occasions before the end of a random-access response (RAR) window, which may be configured by a network. There is a risk of contention, if other UEs choose to transmit on the same resource blocks using the same preamble sequence. At act 410, the base station 404 sends the UE 402 scheduling commands followed by one or more RARs, which may address to the PRACH preambles or preamble indices of the detected Msg1. At act 412, the UE 402 sends its RRC message using the uplink grant. At act 414, the base station 404 sends contention resolution.

Similar to a contention-free RACH procedure, the indication of which one or ones of the multiple transmitted Msg1 are detected by the base station 404 can be explicitly signaled in an RAR, and/or implied by one or more signatures that are associated with the multiple RACH transmission occasions. In addition to the possible signatures described with respect to the contention-free RACH procedure 300, the contention-based RACH procedure 400 may include signatures such as PRACH preambles or preamble indices, which may be used by a base station to reserve specific resource blocks for the PRACH.

The UE 402 may determine which one or ones of Msg1 are detected by reading the detected preamble indices (RAPID) in one or more received RARs. The PRACH preambles or preamble indices may be associated with the multiple RACH transmission occasions by higher layer signaling, e.g., a handover command. For example, the reserved preamble index on the k-th dedicated RACH occasion is k0+k and the reserved preamble index on the (k+1)-th dedicated RACH occasion is k0+k+1 and so on. When a received RAR contains a RAPID of k0+k, the UE knows the Msg1 transmitted on the k-th RACH transmission occasion has been detected. Alternatively, the association information between the multiple RACH transmission occasions and the PRACH preambles or preamble indices may be partially given by higher layer signaling and partially pre-defined in a network's specification.

The UE 402 may also determine which TX beam or beams to use in following uplink (UL) transmissions, for example, Msg3 at act 412. If one or more received RARs correspond to a single Msg1 that the UE 402 has transmitted, the UE 402 may determine which UL TX beam to use by reading the information of the preamble index and/or the RACH occasion on which the Msg1 has been detected from the received RAR if it is explicitly indicated. For example, the UE 402 may apply different TX beam indices when conducting multiple Msg1 transmissions on multiple RACH transmission occasions. Alternatively or additionally, the UE 402 may determine which UL TX beam to use based on the detected Msg1 indicated by one or more received RARs, which may carry explicit or implied signals indicating the detected Msg1 and association information between the UE's TX beams and the detected Msg1.

If multiple RARs are received or the received RAR correspond to multiple Msg1 that the UE 402 has transmitted, the UE 402 may determine which UL TX beam or beams to use for following UL transmissions based on performance indicators, e.g., detection power level of Msg1. The performance indicators may be carried in the received RARs. For example, the UE 402 may compare the performance indicators carried in the RARs sent by the base station 404 and select the TX beam or beams with the highest performance indicators. Alternatively or additionally, the UE 402 may use one or more UL grants scheduled in the one or more received RARs with the UE's corresponding TX beam or beams for following UL transmissions if it is allowed by a network specification and configured by the base station 404 that sends the one or more RARs.

Figure 6:
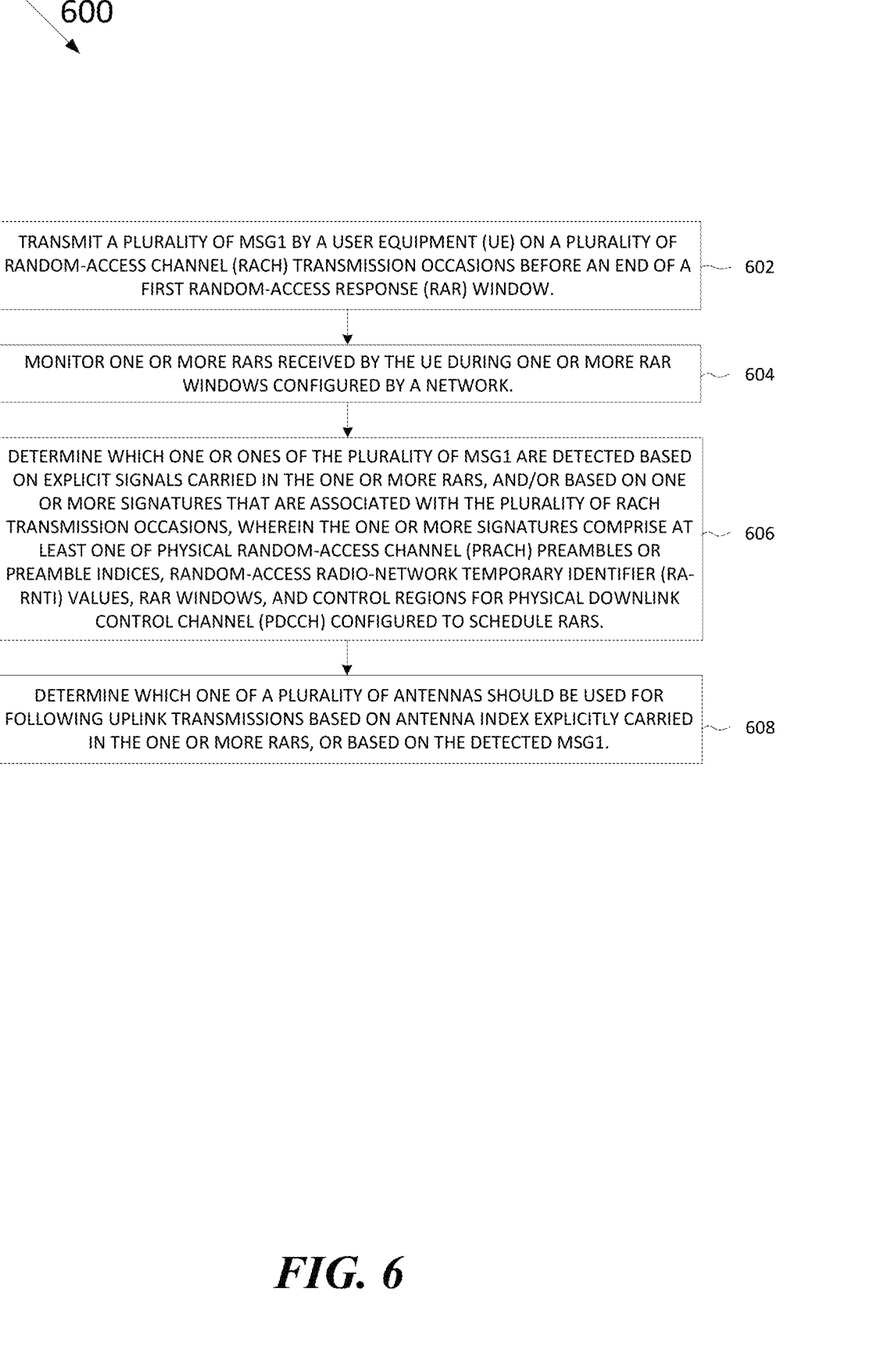
FIG. 6 shows an exemplary method for transmitting multiple Msg1 by a UE in a RACH procedure, according to some embodiments.

FIG. 6 shows an exemplary method 600 for transmitting multiple Msg1 by a UE (e.g., UE 102, UE 302, and UE 402) in a RACH procedure (e.g., contention-free RACH procedure 300, contention-based RACH procedure 400), according to some embodiments. At act 602, the UE may transmit a plurality of Msg1 on a plurality of RACH transmission occasions before an end of a first RAR window. At act 604, the UE may monitor one or more received RARs during one or more RAR windows configured by a network. At act 606, the UE may determine which one or ones of the plurality of Msg1 are detected based on explicit signals carried in the one or more RARs, and/or based on one or more signatures that are associated with the plurality of RACH transmission occasions. The one or more signatures may comprise at least one of PRACH preambles or preamble indices, RA-RNTI values, RAR windows, and control regions for PDCCH configured to schedule RARs. At act 608, the UE may determine which one of a plurality of antennas should be used for following uplink transmissions based on antenna index explicitly carried in the one or more RARs, or based on the detected Msg1. It should be appreciated that it is not necessary for a UE to perform every act in method 600 to transmit multiple Msg1. In some embodiments, a UE may perform a portion of acts in method 600 to transmit multiple Msg1. For example, the UE 302 may perform acts 602-606 in the contention-free RACH procedure 300. In some embodiments, a UE may perform acts in additions to the acts 602-608 to transmit multiple Msg1. For example, a UE may associate a plurality of RACH transmission occasions with one or more the above-mentioned signatures, when the RARs do not carry explicit signals indicating which one or ones of the multiple Msg1 are detected. Examples of how a UE may associate a signature to the multiple RACH transmission occasions are described with respect to FIGS. 3-5.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for performing a random-access channel (RACH) procedure, the method comprising:
    transmitting a plurality of physical random-access channel preambles (Msg1) by a user equipment (UE) on a plurality of RACH transmission occasions before an end of a first random-access response (RAR) window; and
    determining which one or ones of the plurality of Msg1 are detected based on explicit signals carried in one or more RARs received by the UE, and/or based on one or more signatures that are associated with the plurality of RACH transmission occasions.

2. The method of claim 1, wherein the one or more signatures comprise random-access radio-network temporary identifier (RA-RNTI) values which are associated with the plurality of RACH transmission occasions on which the multiple Msg1 transmissions have been transmitted.

3. The method of claim 1, wherein the one or more signatures comprise one or more RAR windows during which the one or more RARs are sent.

4. The method of claim 1, wherein:
    the one or more signatures comprise control regions for physical downlink control channel (PDCCH) configured to schedule RARs,
    the control regions comprise control resource sets (CORESETs) and search spaces, and
    the CORESETs and/or search spaces are associated with the plurality of RACH transmission occasions.

5. The method of claim 1, wherein:
    the one or more signatures comprise physical random-access channel (PRACH) preambles or preamble indices, and
    the preamble indices are associated with the plurality of RACH transmission occasions completely or partially by higher layer signaling.

6. A user equipment (UE) comprising:
    a plurality of antennas; and
    a processor in communication with memory, the processor being configured to execute instructions stored in the memory that cause the processor to:
        transmit a plurality of physical random-access channel preambles (Msg1) over one or more of the plurality of antennas on a plurality of RACH transmission occasions before an end of a first random-access response (RAR) window, and
        determine which one or ones of the plurality of Msg1 are detected based on explicit signals carried in one or more RARs received by the UE, and/or based on one or more signatures that are associated with the plurality of RACH transmission occasions.

7. The UE of claim 6, wherein the one or more signatures comprise at least one of physical random-access channel (PRACH) preambles or preamble indices, random-access radio-network temporary identifier (RA-RNTI) values, RAR windows, and control regions for physical downlink control channel (PDCCH) configured to schedule RARs.

8. The UE of claim 6, wherein the one or more signatures comprise random-access radio-network temporary identifier (RA-RNTI) values which are associated with the plurality of RACH transmission occasions on which the multiple Msg1 transmissions have been transmitted.

9. The UE of claim 6, wherein the one or more signatures comprise RAR windows during which the one or more RARs are sent.

10. The UE of claim 6, wherein:
    the one or more signatures comprise control regions for physical downlink control channel (PDCCH) configured to schedule RARs,
    the control regions comprise control resource sets (CORESETs) and search spaces, and
    the CORESETs and/or search spaces are associated with the plurality of RACH transmission occasions.

11. The UE of claim 6, wherein:
    the one or more signatures comprise physical random-access channel (PRACH) preambles or preamble indices, and
    the PRACH preambles or preamble indices are associated with the plurality of PRACH transmission occasions completely or partially by higher layer signaling.

12. The UE of claim 6, wherein if the one or more RARs is a single RAR or correspond to a single Msg1 of the plurality of Msg1 , tennas should be used for following uplink transmissions based on antenna index explicitly the processor being further configured to execute instructions stored in the memory that cause the processor to:
    determine which one of the plurality of an carried in the one or more RARs, or based on the detected Msg1 indicated by the one or more RARs.

13. The UE of claim 6, wherein if the one or more RARs are more than one RARs or correspond to more than one of the plurality of Msg1, the processor being further configured to execute instructions stored in the memory that cause the processor to:
    determine which one of the plurality of antennas should be used for following uplink transmissions based on performance indicators carried in the received RARs.

14. The UE of claim 6, wherein if the one or more RARs are more than one RARs or correspond to more than one of the plurality of Msg1, the processor being further configured to execute instructions stored in the memory that cause the processor to:
    use one or more uplink grants scheduled in the one or more RARs with the UE's corresponding antennas for following uplink transmissions if it is allowed by a network specification and configured by a base station that sends the one or more RARs.

15. A user equipment (UE) comprising:
    a plurality of antennas; and
    a processor in communication with memory, the processor being configured to execute instructions stored in the memory that cause the processor to:
        transmit a plurality of physical random-access channel preambles (Msg1)over one or more of the plurality of antennas on a plurality of RACH transmission occasions before an end of a first random-access response (RAR) window, and
        determine which one or ones of the plurality of Msg1 are detected based on one or more RARs received by the UE during one or more RAR windows configured by a network.

16. The UE of claim 15, wherein the one or more RAR windows is the first RAR window, the first RAR window starts after a predetermined duration after one of the plurality of Msg1 is transmitted.

17. The UE of claim 16, wherein the size of the first RAR window is configured by the network via higher layer signaling or is configured to be the same as the size of an RAR window for single Msg1 transmission.

18. The UE of claim 16, wherein the first RAR window starts after the predetermined duration after the first Msg1 of the plurality of Msg1 is transmitted or the last Msg1 of the plurality of Msg1 is transmitted.

19. The UE of claim 15, wherein the one or more RAR windows are a plurality of RAR windows, each starting after a predetermined duration after one of the plurality of Msg1 is transmitted and having the same time duration.

20. The UE of claim 15, wherein determining which one or ones of the plurality of Msg1 are detected comprises reading explicit signals carried in the one or more RARs or deriving from one or more signatures carried in the one or more RARs.

* * * * *